May 29, 1928.  T. C. DEUTSCHMANN  1,671,148
CONDENSER
Filed Nov. 17, 1924
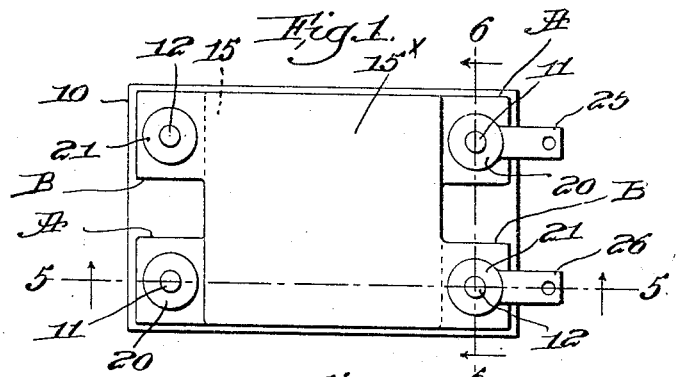
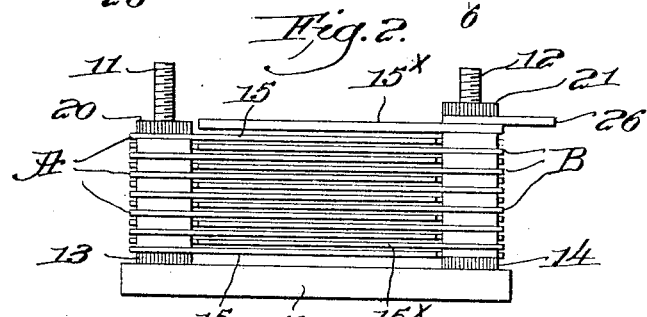
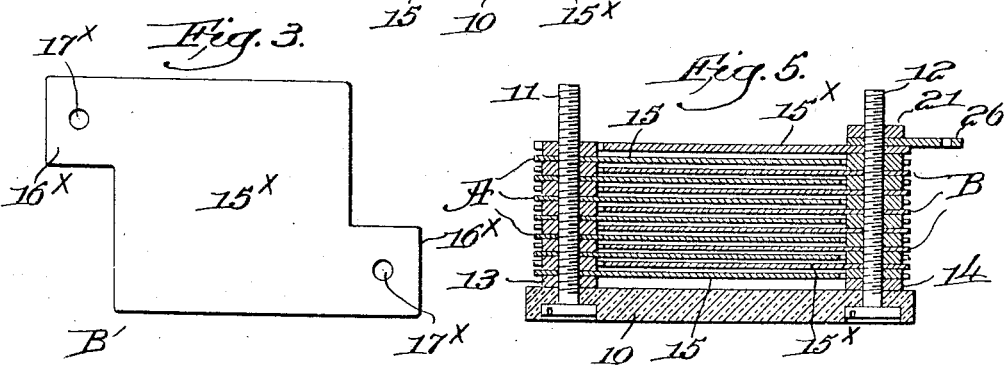
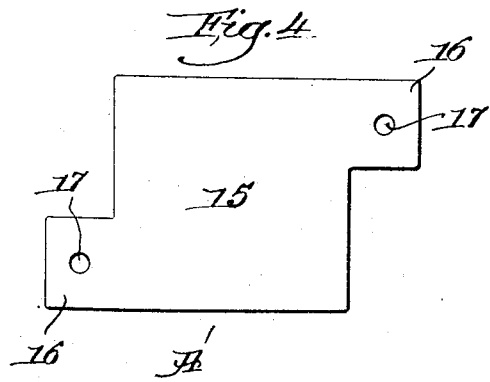
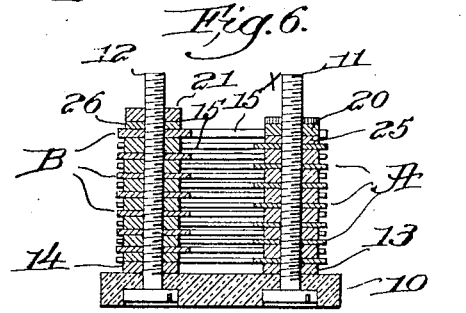
Inventor:
Tobe C. Deutschmann
by Edward G. Allen
his Atty.

Patented May 29, 1928.

1,671,148

UNITED STATES PATENT OFFICE.

TOBE C. DEUTSCHMANN, OF BOSTON, MASSACHUSETTS.

CONDENSER.

Application filed November 17, 1924. Serial No. 750,380.

This invention relates to condensers for use in connection with electrical apparatus and pertains more particularly to the so called fixed air condenser.

It is an object of the invention to produce a simple, easily and cheaply constructed fixed condenser, wherein the use of insulation is dispensed with between the plates of different groups or series.

It is a further object of the invention to so construct and arrange the plates of the condenser that each of them may be firmly secured, and in electrical contact with its neighbor in its particular series, even though the plates of another series alternate therewith and are spaced between them.

Another object of the invention is to so construct and arrange a fixed condenser that its capacity may be increased or decreased at will by the addition or removal of plates.

Heretofore fixed condensers have been made of alternate layers of insulation and metal foil, or other suitable conductor, the foil being arranged in two series, the foil of each series being in electrical contact, but insulated from the foil of the other series, the whole being enclosed and sealed in such manner that the condenser capacity could not be increased or decreased by the addition or subtraction of foil.

It is an object of the present invention to so construct the condenser that plates may be added or taken away from it at a moment's notice, and without injury, and by the average person without expert knowledge or special tools.

To the attainment of the above objects the invention consists in certain features of construction and arrangement of parts which will be fully understood from a description of the drawing and the claim hereinafter given.

Of the drawing:

Figure 1 represents in top plan view, one form of fixed condenser embodying the invention.

Figure 2 is a side elevation of Figure 1.

Figure 3 is a view of the top plate as seen in Figure 1 removed.

Figure 4 is a view of the plate, next below the top plate, portions of which are seen in Figure 1.

Figure 5 is a section on the line 5—5 Figure 1.

Figure 6 is a section on the line 6—6 Figure 1.

Like characters represent like parts throughout the several figures of the drawing.

Referring to the drawing:

The drawing herewith illustrates a form of fixed condenser suitable for use in connection with radio sets but it will be understood that it is applicable to other uses, and therefore it is not the intention to limit the invention to the precise construction and arrangement shown as slight changes might be made therein without departing from its spirit and scope.

In the present instance a base 10, of insulating material, has the upstanding screws 11, 11 and 12, 12 secured thereto by means of nuts 13, 13 and 14, 14, but it will be understood that they may be secured in any suitable manner, but preferably in such way that they may be removed.

The plates comprising the condenser are arranged in two series, and are the same size and shape, the plates of one series being mounted in a position reversed from that of the other series, and have a generally rectangular body 15, with diagonally arranged wings or extensions 16 at opposite sides thereof, which have the holes 17, as seen in Figure 4 which, let it be supposed, represents one of the series A plates, while Figure 3 represents one of the series B plates.

Viewing Figures 1, 2, 5 and 6 it will be seen that the bottom plate is a series A plate, with the screws 11, 11 passing through its holes 17, 17, next above it is a series B plate, with holes 17x, 17x, through which the screws 12, 12 pass, and having washers 18 between it and the nuts 14.

Next above the series B plate is a series A plate which however is separated from the first series A plate by metal washers 19 on the screws 11, 11, the said washers being of a sufficient thickness to properly separate the plates so that there will be air space of the required amount between each of the plates and to permit the plates of one series to be positioned between the plates of the other series.

From the foregoing it will be readily understood that a condenser may be built up to the required capacity by adding first a plate of one series and then a plate of the other, alternating, until the capacity is arrived at, and by applying nuts 20, 20 and 21, 21 the plates of both series may be firmly locked in position.

For convenience in connecting the condenser in circuit terminals 25 and 26 are used, one of which, 25, may be attached to either one of the screws 11, while the other 26, may be attached to either one of the screws 12, as the series A plates are secured to the screws 11, and the series B plates are secured to the screws 12.

To reduce the capacity of the condenser, one or more plates may be removed to suit the occasion.

Having described the invention I claim:

A condenser of the class described comprising a plurality of nude metal plates identical in form and shape, arranged in a stack and separated to provide air spaces between them, each of said plates comprising a rectangular body portion provided upon two opposite sides with parallel apertured ears that are diagonally opposite each other, said plates being constituted by two sets whereof those of one set are reversed with respect to their ears with relation to the plates of the other set; a base of insulating material; four upstanding posts on said base disposed in a rectangular group and whereof each pair of diagonally disposed posts extends through the apertures of the ears of one set of plates only; spacing washers on said posts alternating with the ears of said plates, and means for clamping said plates and washers together in positions on said posts.

Signed by me at Boston, Massachusetts, this 11th day of November, 1924.

TOBE C. DEUTSCHMANN.